United States Patent [19]
Keegan

[11] Patent Number: 5,890,558
[45] Date of Patent: Apr. 6, 1999

[54] ALL-WHEEL STEERING MECHANISM FOR A CLEANING VEHICLE

[75] Inventor: Philip R. Keegan, Whispering Pines, N.C.

[73] Assignee: Minuteman International, Inc., Addison, Ill.

[21] Appl. No.: 827,392

[22] Filed: Mar. 27, 1997

[51] Int. Cl.$^6$ .............................. B62D 7/15; B62D 61/06
[52] U.S. Cl. .................. 180/211; 180/215; 180/403; 180/409; 280/103; 280/773; 280/93.506; 280/93.507; 15/340.1
[58] Field of Search .................................. 180/211, 212, 180/215, 216, 210, 256, 258, 403, 409, 414, 408, 435; 280/773, 846, 95.1, 103, 98, 93.506, 93.507, 93.505; 15/340.1, 340.3, 340.4

[56] References Cited

U.S. PATENT DOCUMENTS

| | | | |
|---|---|---|---|
| 1,271,273 | 7/1918 | Carr | 180/211 |
| 1,891,578 | 12/1932 | Reed | 180/409 |
| 2,559,379 | 7/1951 | Szekely | 180/211 |
| 3,895,843 | 7/1975 | Wall et al. | 180/210 |
| 4,589,510 | 5/1986 | Duerwald et al. | 180/211 |
| 4,703,824 | 11/1987 | Irimajiri et al. | 180/215 |
| 4,977,733 | 12/1990 | Samejima et al. | 180/409 |
| 5,467,500 | 11/1995 | O'Hara et al. | 15/320 |
| 5,485,653 | 1/1996 | Knowlton et al. | 15/340.4 |

*Primary Examiner*—Peter C. English

[57] ABSTRACT

A cleaning vehicle including an all-wheel steering mechanism. First, second and third wheels are mounted to the vehicle for rotation about respective first, second and third rotational axes and for pivotal movement about respective first, second and third pivot axes. The first and second wheels are located transversely across from one another and are both driven by a drive mechanism. The steering mechanism includes a pivot arm pivotally attached to the vehicle. A first steering linkage operatively connects the pivot arm to the first wheel, a second steering linkage operatively connects the pivot arm to the second wheel, and a third steering linkage operatively connects the pivot arm to the third wheel. Pivotal movement of the pivot arm causes conjoint pivotal movement of the first and second wheels in a first pivotal direction and pivotal movement of the third wheel in a second opposite pivotal direction.

19 Claims, 4 Drawing Sheets

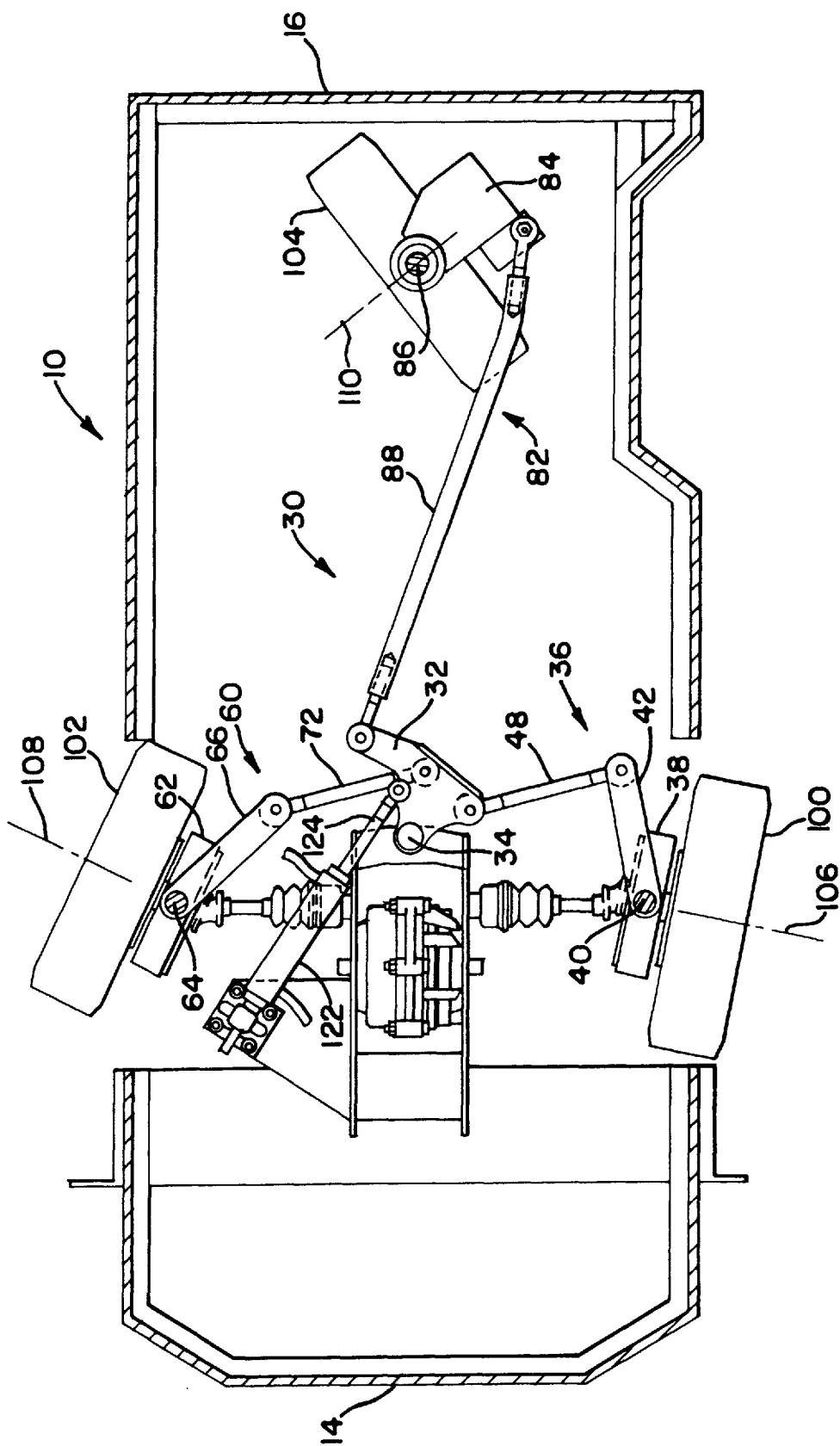

ALL-WHEEL STEERING MECHANISM FOR A CLEANING VEHICLE

BACKGROUND OF THE INVENTION

The present invention relates to cleaning vehicles and in particular to a steering mechanism for a cleaning vehicle which conjointly turns or pivots all of the wheels of the cleaning vehicle when a change in vehicle direction is desired.

Cleaning vehicles such as rider sweepers, rider scrubbers, and combination sweeping and scrubbing machines need to be very maneuverable in order to do an effective job in cleaning floors or other surfaces around obstacles and in tight locations within factories or other types of facilities. A typical three-wheel cleaning vehicle is configured such that the third wheel, which is longitudinally offset from the other two wheels of the vehicle, is located at the front of the vehicle and is selectively pivotal, while the other two wheels are non-pivotal, such that the cleaning vehicle steers from the front. The third wheel can alternatively be located behind the other two wheels at the rear of the vehicle and consequently the vehicle will steer from the rear. With just one wheel being pivotal to steer the vehicle, the vehicle is limited in maneuverability when it is positioned close to objects, such as when sweeping and scrubbing along a wall. When a rear-steering vehicle is being used to clean along the edge of a wall, the vehicle must be inched away from the wall well in advance of encountering the upcoming obstruction in order to steer the vehicle away from the wall when the obstruction is encountered. Otherwise, in a rear-steering vehicle, a sharp turn will shift the back end of the vehicle up against the wall creating interference and possibly damaging the vehicle and the wall.

When the third wheel that steers the vehicle is located at the front of the vehicle, such as on a typical direct-throw style sweeper, the wheel is placed directly in the path of the debris and limits the effectiveness of this type of sweeper. Often, to maximize maneuverability on a three-wheeled vehicle, the third wheel is also the drive wheel as well as the steering wheel. Thus, the power that propels the vehicle is transferred through just one wheel to the support surface. When just one drive wheel is used, having sufficient traction between the drive wheel and the support surface is a concern and a problem, especially in connection with scrubbing machines where the drive wheel encounters wet surfaces created by the cleaning vehicle.

The present all-wheel steering mechanism powers two front wheels for improved traction over a one-wheel powered design. The steering mechanism connects the two front wheels and a third rear wheel such that each wheel conjointly turns or pivots when a change in direction of the vehicle is desired. When the cleaning vehicle of the present invention with the all-wheel steering mechanism is scrubbing or sweeping close to a wall and makes a turn, the vehicle may be pulled away from the wall by conjointly turning both front wheels in a first direction, such that the front end of the vehicle moves away from the wall, and conjointly turning the rear wheel in a second opposite direction, such that the back end of the vehicle moves toward the wall. This provides a quick break-away from the wall or other obstruction without creating any interference. The third wheel is located at the rear of the vehicle behind the two front drive wheels. Therefore the sweeping mechanism of the cleaning vehicle, which is a direct-throw style, has no wheels in the debris path causing interference. As the two front drive wheels are powered and are located ahead of the scrubbing system, they will typically be located on a dry surface to provide enhanced traction and driving control.

SUMMARY OF THE INVENTION

A ride-on cleaning vehicle having an all-wheel steering mechanism is provided for movement over a support surface that is to be cleaned. The cleaning vehicle includes a first wheel mounted to the vehicle for rotation about a first rotational axis and for pivotal movement or turning about a first pivot axis, a second wheel mounted to the vehicle for rotation about a second rotational axis and for pivotal movement or turning about a second pivot axis, and a third wheel mounted to the vehicle for rotation about a third rotational axis and for pivotal movement or turning about a third pivot axis. The first and second wheels are located generally transversely across from one another and toward the front of the vehicle. The third wheel is located longitudinally behind the first and second wheels toward the rear end of the vehicle, such that the three wheels are located in a generally triangular arrangement relative to one another.

The cleaning vehicle includes an all-wheel steering mechanism for selectively and conjointly pivoting the first, second and third wheels respectively about their first, second and third pivot axes. The steering mechanism includes a pivot arm pivotally attached to the frame of the vehicle such that the pivot arm is pivotal about a fourth pivot axis. A first steering linkage operatively connects the pivot arm to the first wheel. A second steering linkage operatively connects the pivot arm to the second wheel. A third steering linkage operatively connects the pivot arm to the third wheel. Pivotal movement of the pivot arm about the fourth pivot axis causes the steering linkages to conjointly pivot or turn the first, second and third wheels respectively about the first, second and third pivot axes. Pivotal movement of the pivot arm through a selected angular magnitude results in pivoting the first wheel a first angular magnitude, pivoting the second wheel a second angular magnitude, and pivoting the third wheel a third angular magnitude, wherein the second angular magnitude is greater than the first angular magnitude and the third angular magnitude is greater than the second angular magnitude.

The cleaning vehicle includes actuating means for selectively pivoting the pivot arm about the fourth pivot axis. The actuating means includes a hydraulic cylinder having a selectively extendable and retractable ram connected to the pivot arm. The actuating means also includes a manually operated pump for selectively extending and retracting the ram of the cylinder.

BRIEF DESCRIPTION OF THE DRAWING FIGURES

FIG. 4 is a top plan view of the steering mechanism and wheels positioned for making a right-hand turn.

DETAILED DESCRIPTION OF THE PREFERRED EMBODIMENT

Figure 1:
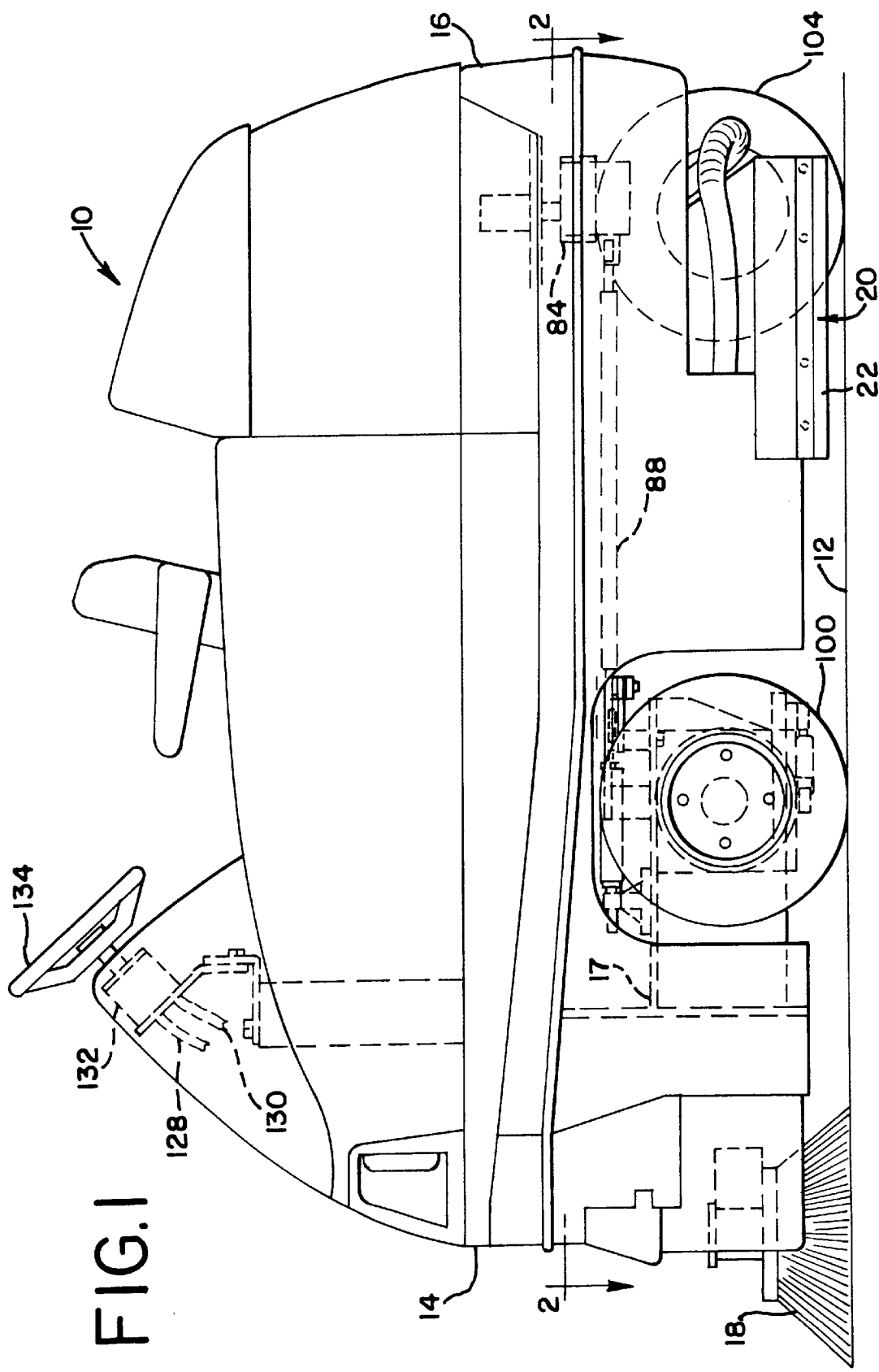
FIG. 1 is a side elevational view of the cleaning vehicle having the all-wheel steering mechanism of the present invention.

FIG. 1 shows the cleaning vehicle 10 of the present invention. The cleaning vehicle 10 is self-propelled for movement over a support surface 12 that is to be cleaned by sweeping and/or scrubbing. The support surface 12 may comprise a floor, sidewalk, parking lot and other types of surfaces that may be formed from concrete, asphalt, tile, brick and other materials. The cleaning vehicle 10 includes a front end 14, a rear end 16 and a frame 17. The cleaning vehicle 10 also includes a scrub brush 18 mounted at the front end 14 for rotation about a vertical axis and a scrubbing mechanism 20 mounted at the rear end 16. The scrubbing mechanism 20 includes one or more scrub brushes (not shown), a dispenser for dispensing cleaning fluid onto the surface 12 to be cleaned and a squeegee 22 for picking up the cleaning fluid from the surface 12 along with any dirt or debris that has been dislodged by the scrub brushes. The scrub brush 18 and the scrubbing mechanism 20 may be selectively raised to disengage the support surface 12 or lowered to engage the support surface 12 as desired.

Figure 2:
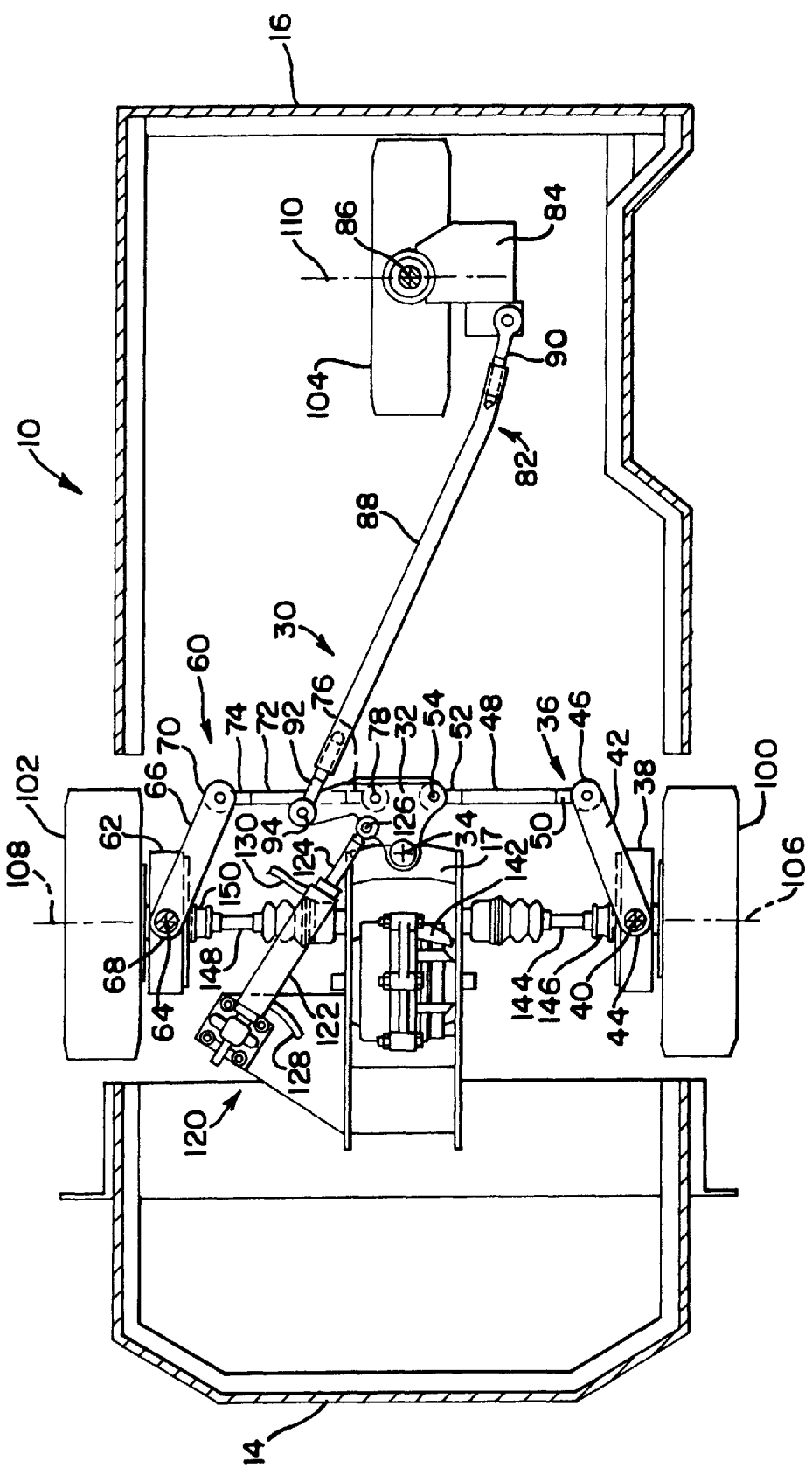
FIG. 2 is a cross sectional view taken along lines 2—2 of FIG. 1 showing the steering mechanism and wheels positioned for linear travel.

As best shown in FIG. 2, the cleaning vehicle 10 includes an all-wheel steering mechanism 30. The steering mechanism 30 includes a pivot arm 32 that is pivotally attached to the frame 17 for selective pivotal movement about a vertical pivot axis 34. The steering mechanism 30 also includes a first steering linkage 36. The first steering linkage 36 includes a wheel support 38 pivotally mounted to the frame 17 of the cleaning vehicle 10 for selective pivotal movement about a vertical pivot axis 40. A steering lever arm 42 includes a first end 44 that is rigidly affixed to the wheel support 38 for conjoint pivotal movement therewith and a second end 46. A push rod 48 includes a first end 50 pivotally attached to the second end 46 of the steering lever arm 42 and a second end 52 pivotally attached to the pivot arm 32 for pivotal movement about a vertical pivot axis 54.

The steering mechanism 30 includes a second steering linkage 60. The second steering linkage 60 includes a wheel support 62 pivotally attached to the frame 17 of the cleaning vehicle 10 for selective pivotal movement about a vertical pivot axis 64. The second steering linkage 60 also includes a steering lever arm 66 having a first end 68 rigidly affixed to the wheel support 62 for conjoint pivotal movement therewith and a second end 70. A push rod 72 includes a first end 74 pivotally attached to the second end 70 of the steering lever arm 66 and a second end 76 pivotally attached to the pivot arm 32 for selective pivotal movement about a vertical pivot axis 78.

The steering mechanism 30 includes a third steering linkage 82. The third steering linkage 82 includes a wheel support 84 mounted to the frame 17 of the cleaning vehicle 10 for selective pivotal movement about a vertical pivot axis 86. The third steering linkage 82 includes a push rod 88 having a first end 90 pivotally attached to the wheel support 84 and a second end 92 pivotally attached to the pivot arm 32 for selective pivotal movement about a vertical pivot axis 94. As shown in FIG. 2, the pivot axes 40, 64 and 86 are located in a generally triangular arrangement relative to one another.

The cleaning vehicle 10 includes a first wheel 100, a second wheel 102 and a third wheel 104, each of which is rotatably mounted to the cleaning vehicle 10. The first wheel 100 is connected to the wheel support 38 of the first steering linkage 36 such that the wheel 100 is rotatable with respect thereto about a first horizontal rotational axis 106 and such that the wheel 100 is pivotal about the vertical pivot axis 40 conjointly with the wheel support 38. The second wheel 102 is rotatably connected to the wheel support 62 of the second steering linkage 60 such that the wheel 102 is rotatable with respect thereto about a second horizontal rotational axis 108 and such that the wheel 102 is pivotal about the vertical pivot axis 64 conjointly with the wheel support 62. The third wheel 104 is rotatably connected to the wheel support 84 of the third steering linkage 82 such that the third wheel 104 is rotatable with respect thereto about a third horizontal rotational axis 110 and such that the third wheel 104 is pivotal about the pivot axis 86 conjointly with the wheel support 84. As shown in FIG. 2, the first and second wheels 100 and 102 are disposed transversely across from one another and are located on respective left and right sides of the cleaning vehicle 10 towards the front end 14 of the cleaning vehicle 10. The third wheel 104 is located longitudinally to the rear of the first and second wheels 100 and 102 and is located towards the rear end 16 of the cleaning vehicle 10. The wheels 100, 102 and 104 are located in a generally triangular arrangement with respect to one another.

The steering mechanism 30 also includes an actuator mechanism 120. The actuator mechanism 120 includes a hydraulic cylinder 122 attached to the frame 17 of the cleaning vehicle 10. The hydraulic cylinder 122 includes a ram 124 having an end that is pivotally attached to the pivot arm 32 for selective pivotal movement about a vertical pivot axis 126. The ram 124 is selectively extendable and retractable within the hydraulic cylinder 122. A first hydraulic line 128 is attached to one end of the hydraulic cylinder 122 and a second hydraulic line 130 is attached to a second opposite end of the hydraulic cylinder 122. As best shown in FIG. 1, the opposite ends of the hydraulic lines 128 and 130 are respectively attached to a manually operable hydraulic pump 132, typically referred to as a helm unit. One type of pump 132 that is acceptable is manufactured by Teleflex under Model No. HH5231,SS1.4HELM. A wheel 134 is operably connected to the pump 132 to provide manual operation of the pump 132 by the driver or operator of the cleaning vehicle 10.

Rotation of the wheel 134 by the operator of the cleaning vehicle 10 in a clockwise direction causes the pump 132 to pump hydraulic fluid through the first hydraulic line 128 into the hydraulic cylinder 122 thereby extending the ram 124 from the hydraulic cylinder 122. As the ram 124 extends from the hydraulic cylinder 122, hydraulic fluid leaves the hydraulic cylinder 122 through the second hydraulic line 130 and flows to the pump 132. When the operator of the cleaning vehicle 10 rotates the wheel 134 in a counter-clockwise direction, the pump 132 pumps hydraulic fluid through the second hydraulic line 130 into the hydraulic cylinder 122 thereby retracting the ram 124. As the ram 124 retracts, hydraulic fluid flows from the hydraulic cylinder 122 through the first hydraulic line 128 to the pump 132.

The cleaning vehicle 10 includes one or more batteries (not shown) electrically connected to an electric motor (not shown) for providing propulsive power to the cleaning vehicle 10. The motor is connected to a differential gear box 142. One type of gear box that is acceptable is manufactured by Comex under Model No. 5P276D. The gear box 142 is operatively connected to the first wheel 100 by a drive shaft 144 and a constant velocity joint 146 to provide rotational movement of the wheel 100 about the first rotational axis 106. The gear box 142 is also operatively connected to the second wheel 102 by a drive shaft 148 and a constant velocity joint 150 to provide rotational movement of the second wheel 102 about the second rotational axis 108. The drive means 142 thereby provides rotation of the wheels 100 and 102 about their respective rotational axes 106 and 108. The wheels 100 and 102 are drive and steering wheels, while the third wheel 104 is solely a steering wheel.

In operation, when the ram 124 of the hydraulic cylinder 122 and the pivot arm 32 are in a neutral position, as shown in FIG. 2, the steering mechanism 30 positions the wheels 100, 102 and 104 such that the rotational axes 106, 108 and 110 thereof are parallel to one another whereby the wheels provide linear movement of the cleaning vehicle 10 over the support surface 12.

Figure 3:
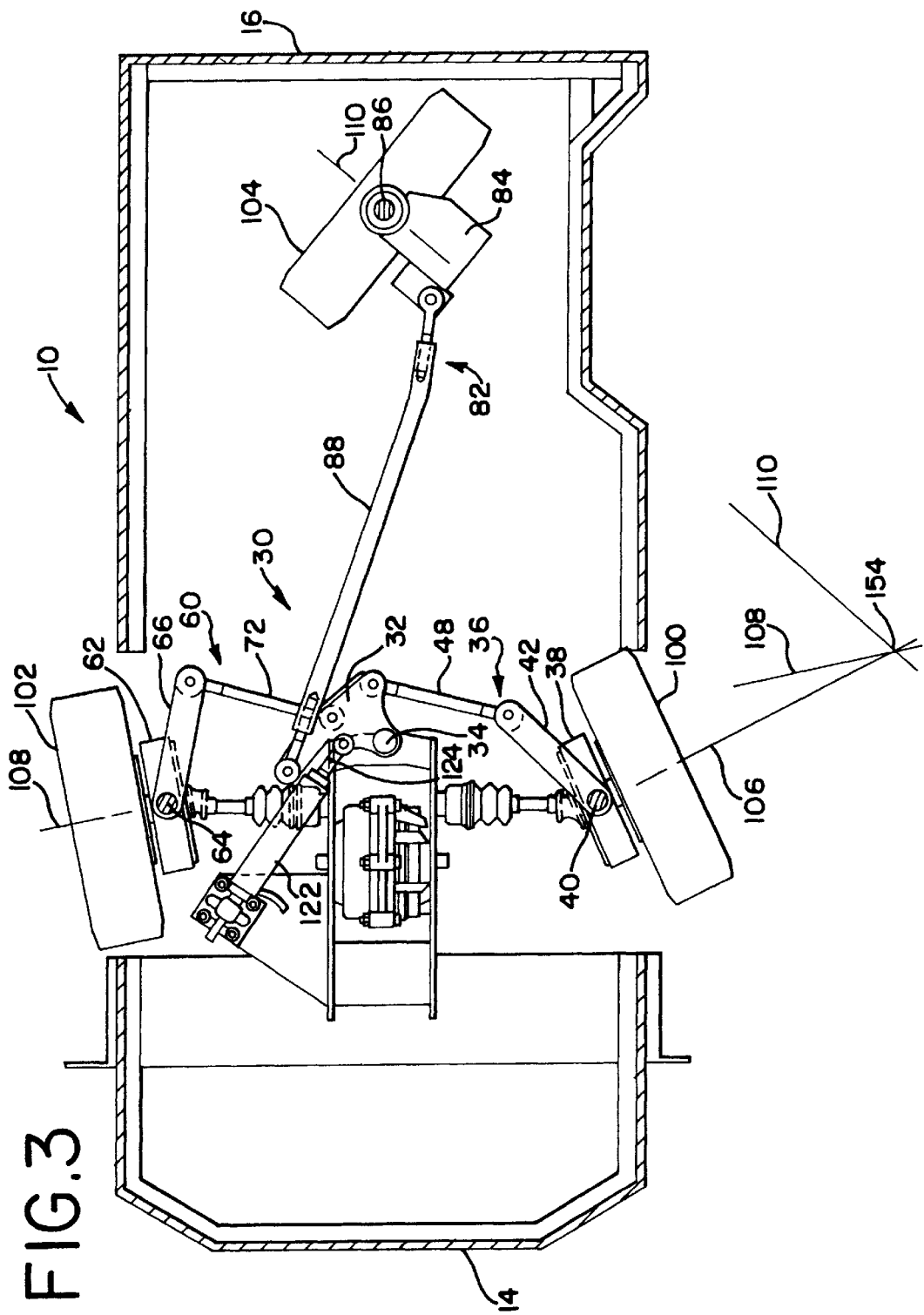
FIG. 3 is a top plan view of the steering mechanism and wheels positioned for making a left-hand turn.

When it is desired to turn the cleaning vehicle 10 in a left-hand or counter-clockwise direction, the operator rotates the wheel 134 in a counter-clockwise direction such that the pump 132 retracts the ram 124 of the hydraulic cylinder 122 from the first neutral position shown in FIG. 2 to a second retracted position such as shown in FIG. 3. As the ram 124 retracts into the cylinder 122, the ram 124 pivots the pivot arm 32 about the pivot axis 34 in a counter-clockwise direction from its neutral position through a selected angular magnitude. The counter-clockwise pivotal movement of the pivot arm 32 causes the first steering linkage 36 to turn or pivot the first wheel 100 in a counter-clockwise direction about the pivot axis 40 through a first angular magnitude. The selected pivotal movement of the pivot arm 32 conjointly causes the second steering linkage 60 to turn or pivot the second wheel 102 in a counter-clockwise direction about the pivot axis 64 through a second angular magnitude that is smaller than the first angular magnitude through which the first wheel 100 was pivoted. Conjointly with the pivoting of the first and second wheels 100 and 102, the selected pivotal movement of the pivot arm 32 causes the third steering linkage 82 to turn or pivot the third wheel 104 in a clockwise direction about the pivot axis 86 through a third angular magnitude which is greater than the first and second angular magnitudes through which the first and second wheels 100 and 102 were pivoted. Thus the selected pivotal movement of the pivot arm 32 provides three different rates of pivotal movement respectively to the wheels 100, 102 and 104. The relative lengths of the push rods 48, 72 and 88 and of the steering lever arms 42 and 66 may be adjusted to provide for various rates of wheel pivot for a selected magnitude of angular movement of the pivot arm 32.

As shown in FIG. 3, the steering mechanism 30 provides pivotal movement of the wheels 100, 102 and 104 such that when the wheels 100, 102 and 104 are pivoted from their neutral positions for linear travel as shown in FIG. 2, the rotational axes 106, 108 and 110 of the wheels approximately intersect at a common point 154. Each wheel 100, 102 and 104 will thereby rotate and travel along an arc of a respective circle wherein each circle has its center at the intersection point 154. This wheel arrangement minmizes the amount of dragging of any of the three wheels on the surface 12 during a turn, which minimizes the risk of leaving any tire marks on the surface 12.

When it is desired to turn the cleaning vehicle 10 in a right-hand or clockwise direction, the operator of the cleaning vehicle 10 turns the wheel 134 in a clockwise direction thereby causing the pump 132 to extend the ram 124 of the hydraulic cylinder 122 from the neutral position as shown in FIG. 2 to an extended position such as shown in FIG. 4. The extension of the ram 124 from the neutral position to the extended position shown in FIG. 4 causes the pivot arm 32 to pivot in a clockwise direction about the pivot axis 34 from its first neutral position through a selected angular magnitude to a second position.

The selected clockwise pivotal movement of the pivot arm 32 causes the first steering linkage 36 to turn or pivot the first wheel 100 in a clockwise direction about the pivot axis 40 through a first angular magnitude. The selected clockwise pivotal movement of the pivot arm 32 conjointly causes the second steering linkage 60 to cause the second wheel 102 to turn or pivot in a clockwise direction about the pivot axis 64 through a second angular magnitude which is larger than the first angular magnitude through which the first wheel 100 was pivoted. The selected clockwise pivotal movement of the pivot arm 32 conjointly causes the third steering linkage 82 to turn or pivot the third wheel 104 in a counter-clockwise direction about the pivot axis 86 through a third angular magnitude which is greater than both the first and second angular magnitudes through which first and second wheels 100 and 102 were pivoted. When the wheels 100, 102 and 104 are pivoted as shown in FIG. 4 their respective rotational axes 106, 108 and 110 substantially intersect at a common intersection point.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A cleaning vehicle for movement over a surface to be cleaned comprising:

a first wheel mounted to said vehicle for rotation about a first rotational axis and for pivotal movement about a first pivot axis;

a second wheel mounted to said vehicle for rotation about a second rotational axis and for pivotal movement about a second pivot axis;

drive means mounted to said vehicle and operatively connected to said first and second wheels for providing rotation of said first and second wheels respectively about said first and second rotational axes and thereby propelling said vehicle;

a third wheel mounted rearwardly of said first and second wheels to said vehicle for rotation about a third rotational axis and for pivotal movement about a third pivot axis;

scrubbing means attached to said vehicle for cleaning the surface, said scrubbing means located rearwardly of said first and second wheels; and a steering mechanism for selectively and conjointly pivoting said first, second and third wheels respectively about said first, second and third pivot axes, said steering mechanism including a pivot arm pivotally attached to said vehicle for pivotal movement about a fourth pivot axis, a first steering linkage operatively connecting said pivot arm to said first wheel, a second steering linkage operatively connecting said pivot arm to said second wheel, and a third steering linkage operatively connecting said pivot arm to said third wheel, whereby pivotal movement of said pivot arm causes conjoint pivotal movement of said first, second and third wheels respectively about said first, second and third pivot axes.

2. The cleaning vehicle of claim 1 wherein said first, second and third wheels are located in a generally triangular arrangement with respect to one another.

3. The cleaning vehicle of claim 1 including actuating means for selectively pivoting said pivot arm about said fourth pivot axis.

4. The cleaning vehicle of claim 3 wherein said actuating means includes a cylinder having a selectively extendable and retractable ram connected to said pivot arm, whereby the selective extension of said ram causes said pivot arm to pivot about said fourth pivot axis in a first pivotal direction and the selective retraction of said ram causes said pivot arm to pivot about said fourth axis in a second pivotal direction.

5. The cleaning vehicle of claim 4 wherein said actuating means includes a pump for selectively extending and retracting said ram of said cylinder.

6. The cleaning vehicle of claim 5 wherein said pump is manually operated.

7. The cleaning vehicle of claim 1 wherein said first steering linkage includes a first wheel support operatively attached to said first wheel to provide pivotal movement of said first wheel about said first pivot axis, and a first push rod having a first end pivotally connected to said pivot arm and a second end operatively connected to said first wheel support.

8. The cleaning vehicle of claim 7 wherein said first steering linkage includes a first steering lever arm attached to said first wheel support, said second end of said first push rod being pivotally connected to said first steering lever arm.

9. The cleaning vehicle of claim 7 wherein said second steering linkage includes a second wheel support operatively attached to said second wheel for providing pivotal movement of said second wheel about said second pivot axis, and a second push rod having a first end pivotally connected to said pivot arm and a second end operatively connected to said second wheel support.

10. The cleaning vehicle of claim 9 wherein said second steering linkage includes a second steering lever arm attached to said second wheel support, said second end of said second push rod being pivotally connected to said second steering lever arm.

11. The cleaning vehicle of claim 9 wherein said third steering linkage includes a third wheel support operatively attached to said third wheel for providing pivotal mohvement of said third wheel about said third pivot axis, and a third push rod having a first end pivotally attached to said pivot arm and a second end pivotally attached to said third wheel support.

12. The cleaning vehicle of claim 1 including a first constant velocity joint operatively connecting said drive means to said first wheel and a second constant velocity joint operatively connecting said drive means to said second wheel.

13. The cleaning vehicle of claim 1 wherein said first, second and third wheels are conjointly pivotal from respective first positions wherein said first, second and third rotational axes of said first, second and third wheels are generally parallel to one another, to respective second positions wherein said first, second and third rotational axes generally intersect one another at a common intersection point.

14. The cleaning vehicle of claim 1 wherein said first steering linkage is pivotally connected to said pivot arm for pivotal movement therebetween about a fifth pivot axis, said second steering linkage is pivotally connected to said pivot arm for pivotal movement therebetween about a sixth pivot axis, and said third steering linkage is pivotally connected to said pivot arm for pivotal movement therebetween about a seventh pivot axis.

15. The cleaning vehicle of claim 1 wherein said first and second wheels are located transversely across from one another with respect to said cleaning vehicle and said third wheel is longitudinally offset from said first and second wheels.

16. The cleaning vehicle of claim 1 including means for pivoting said pivot arm in a first pivotal direction such that said pivot arm causes said first and second steering linkages to respectively pivot said first and second wheels in said first pivotal direction and such that said pivot arm causes said third steering linkage to pivot said third wheel in a second pivotal direction opposite to said first pivotal direction.

17. A cleaning vehicle for movement over a surface to be cleaned comprising:
   a first wheel mounted to said vehicle for rotation about a first rotational axis and for pivotal movement about a first pivot axis;
   a second wheel mounted to said vehicle for rotation about a second rotational axis and for pivotal movement about a second pivot axis;
   drive means mounted to said vehicle and operatively connected to said first and second wheels for providing rotation of said first and second wheels respectively about said first and second rotational axes and thereby propelling said vehicle;
   a third wheel mounted rearwardly of said first and second wheels to said vehicle for rotation about a third rotational axis and for pivotal movement about a third pivot axis; and
   a steering mechanism for selectively and conjointly pivoting said first, second and third wheels respectively about said first, second and third pivot axes, said steering mechanism including a pivot arm pivotally attached to said vehicle for pivotal movement about a fourth pivot axis, a first steering linkage operatively connecting said pivot arm to said first wheel, said first steering linkage being pivotally connected to said pivot arm for pivotal movement therebetween, a second steering linkage operatively connecting said pivot arm to said second wheel, said second steering linkage being pivotally connected to said pivot arm for pivotal movement therebetween, and a third steering linkage operatively connecting said pivot arm to said third wheel, said third steering linkage being pivotally connected to said pivot arm for pivotal movement therebetween, a cylinder having a selectively extendable and retractable ram connected to said pivot arm for selectively pivoting said pivot arm about said fourth pivot axis, and a manually operated pump operatively connected to said cylinder for selectively extending or retracting said ram of said cylinder, whereby the selective extension of said ram causes said pivot arm to pivot about said fourth pivot axis in a first pivotal direction and the selective retraction of said ram causes said pivot arm to pivot about said fourth pivot axis in a second pivotal direction.

18. The cleaning vehicle of claim 17 including a manually operated steering member operatively connected to said pump such that manual movement of said steering member selectively extends and retracts said ram of said cylinder.

19. The cleaning vehicle of claim 18 wherein said steering member comprises a steering wheel.

* * * * *